United States Patent [19]

Lindsey

[11] Patent Number: 4,782,039

[45] Date of Patent: Nov. 1, 1988

[54] SELECTIVE CATALYTIC REDUCTION CATALYST AND A PROCESS FOR PREPARING THE CATALYST

[75] Inventor: Keck Lindsey, Boyertown, Pa.

[73] Assignee: Johnson Matthey, Inc., Valley Forge, Pa.

[21] Appl. No.: 864,489

[22] Filed: May 19, 1986

[51] Int. Cl.$^4$ .................. B01J 21/04; B01J 23/10; B01J 23/22

[52] U.S. Cl. ...................... 502/304; 423/239

[58] Field of Search .................. 502/304; 423/213.2, 423/239 A

[56] References Cited

U.S. PATENT DOCUMENTS

| | | | |
|---|---|---|---|
| 3,279,884 | 10/1966 | Nonnenmacher et al. | 423/239 A |
| 3,867,312 | 2/1975 | Stephens | 502/302 |
| 3,883,444 | 5/1975 | Maselli et al. | 252/455 R |
| 4,450,244 | 5/1984 | Domesle et al. | 502/462 |

FOREIGN PATENT DOCUMENTS

| | | |
|---|---|---|
| 0075124 | 3/1983 | European Pat. Off. |
| 1400504 | 4/1965 | France |
| 2146358 | 3/1973 | France |
| 2243152 | 4/1975 | France |
| 2376699 | 8/1978 | France |
| 1058706 | 2/1967 | United Kingdom |
| 1430730 | 7/1976 | United Kingdom |
| 1594531 | 7/1981 | United Kingdom |

*Primary Examiner*—W. J. Shine
*Attorney, Agent, or Firm*—Cushman, Darby & Cushman

[57] ABSTRACT

An SCR catalyst consisting essentially of vanadium carried by a mixture of ceria and alumina on a support.

8 Claims, 1 Drawing Sheet

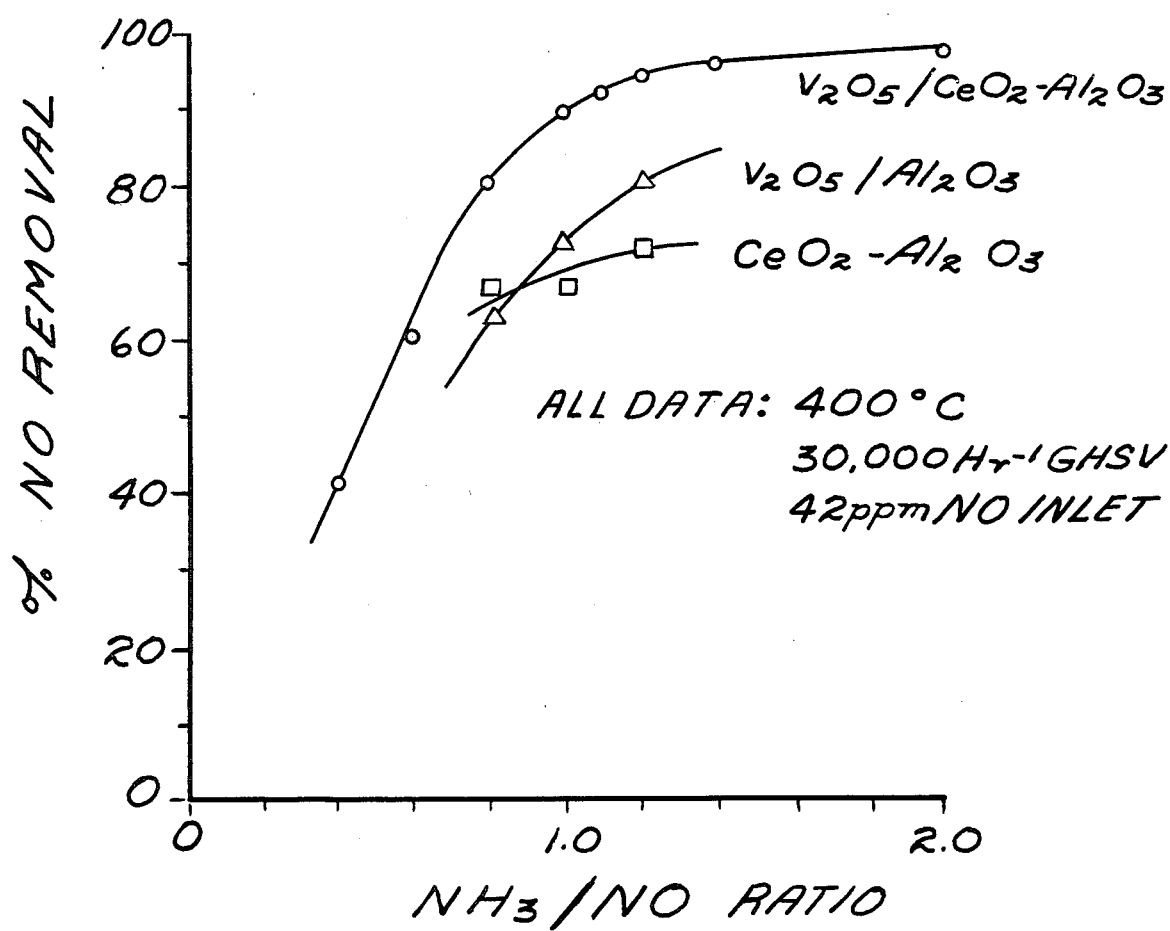

SELECTIVE CATALYTIC REDUCTION CATALYST AND A PROCESS FOR PREPARING THE CATALYST

The present invention is concerned with improved selective catalytic reduction catalysts. For ease of reference these catalysts are hereinafter referred to as "SCR" catalysts.

BACKGROUND TO THE INVENTION

It is known to remove oxides of nitrogen ($NO_x$) pollutants from exhaust streams or other gaseous emission sources which contain excess oxygen by adding $NH_3$ to a gas containing $NO_x$ and passing the mixture over a catalyst to form non-polluting $N_2$ and $H_2O$.

A wide variety of catalysts have been proposed for this purpose. See, for example, U.S. Pat. Nos. 3,279,884 and 4,115,516. Vanadium pentoxide or other oxide supported on alumina has been extensively used as an SCR catalyst. Cerium oxide has also been proposed. See, for instance, the above-mentioned U.S. Pat. No. 4,115,516 as well as U.S. Pat. No. 3,885,019.

The ability to abate $NO_x$ emissions effectively is limited by the selectivity of the catalyst for reacting $NH_3$ with $NO_x$ rather than with $O_2$. While prior catalysts, particularly vanadium pentoxide, have a reasonably good degree of selectivity, there is still a need to improve on the selectivity of such catalysts.

The purpose of the present invention is to provide a vanadium-based SCR catalyst which includes ceria and which shows considerably increased selectivity and higher activity than conventional vanadium pentoxide or ceria oxide-based SCR catalysts.

GENERAL DESCRIPTION OF THE INVENTION

Broadly stated, the catalyst of the invention consists essentially of vanadium oxide supported on a mixture of cerium oxide ($CeO_2$) and alumina ($Al_2O_3$), the mixture itself being supported on a ceramic or metallic substrate or support material. It has been found that the catalyst including this combination of vanadium carried by a mixture of $CeO_2$ and $Al_2O_3$ has a much higher SCR activity than either vanadium alone on alumina or ceria alone on alumina. This activity is greater than would be expected from a knowledge of the respective SCR activities of the individual components. The improved activity of the present catalysts is evidenced by a significantly increased selectivity for the reaction of $NH_3$ with $NO_x$. This has the advantage, over prior vanadia-or ceria-based catalysts, of allowing either increased $NO_x$ abatement under otherwise equivalent conditions or equivalent $NO_x$ abatement using less $NH_3$ or less catalyst.

DETAILED DESCRIPTION OF THE INVENTION

As noted, it is essential to the invention to use a mixture of ceria and alumina to carry or support the vanadia. The amount of ceria so used can be varied in the range of about 2–60% by weight of ceria based on the total weight of ceria and alumina. Preferably the amount of ceria comprises about 5 to 33% of the combined weight of ceria and alumina. This is equivalent to a ceria: alumina ratio of 1:19 to 1:2. However, effective results are also obtained using other ratios although it is essential to use at least 2% ceria. Amounts of ceria beyond 60% can be used but do not appear to significantly improve the catalyst performance.

It is also essential, according to the invention, that the vanadium component be added to the catalyst separately from the cerium to achieve the desired catalyst performance results. Thus, for example, equivalent results are not obtained if the cerium is incorporated together with the vanadium. It is not fully understood why this is so. However, and without intending to be limited to any particular theory, it appears that the indicated sequential incorporation of the ceria and the vanadium may result in a special vanadium-cerium and/or cerium-alumina inter-reaction which is responsible for the improved results.

The ceria-alumina carrier may be prepared in a variety of ways. Thus, for example, ceria or ceria precursor (e.g. cerium hydrate) and alumina powder or alumina precursor may be directly mixed together in the desired amounts, advantageously as a slurry in water. This may then be applied to any conventional ceramic or metal support material, e.g. a ceramic honeycomb made from cordierite or the equivalent as commercially available or high temperature alloy such as the Kanthal or Fecralloy type alloys, steels, etc. in conventional manner, followed by drying and calcining. The vanadium is thereafter applied, usually in the form of an aqueous solution or slurry of vanadia precursor, e.g. a vanadate, followed by drying and calcining.

The vanadium is generally present as the pentoxide although other active oxide forms may be used. Advantageously the vanadium is applied as a slurry or solution of a vanadium compound over the ceria-alumina coating on the substrate, after which the resulting composite is dried and calcined to form the vanadia in situ.

The amount of vanadium in the catalyst will vary but, generally, is between 0.5 and 25% by weight, based on the weight of the ceria-alumina mixture.

It will be appreciated that the catalyst of the invention is used under conventional SCR conditions although, because of the greater selectivity or activity of the catalyst, less $NH_3$ and/or catalyst may be used to obtain effective $NO_x$ abatement than would be possible using conventional catalysts. Representative SCR conditions, using the present catalyst involve mixing $NH_3$ in the exhaust gas stream containnng $NO_x$ at a molar ratio with the $NO_x$ of from 0.4 to 2.0, and contacting the mixture with the catalyst at a temperature of 250° C. to 500° C. at s GHSV of 1000 $hr^{-1}$ to 50,000 $hr^{-1}$.

BRIEF DESCRIPTION OF THE DRAWING

The drawing graphically compares NO conversion using the present catalyst and other catalysts.

The invention is illustrated, but not limited by the following examples:

EXAMPLE 1

An aqueous slurry was prepared by thoroughly mixing together 36 parts ceria hydrate and 86 parts gamma-$Al_2O_3$ in 100 parts water to provide a ratio of 1:3 ceria to alumina by weight (on a calcined basis). A thin coating of this slurry was then applied to a high temperature resistant aluminum containing ferritic stainless steel (ARMCO 18SR) honeycomb monolith (200 cells per square inch) after which the thus coated monolith was dried and calcined at 500° C. for 30 minutes to give a coating of 7.3% of ceria and 17.4% alumina based on the weight of coated monolith. The thus coated monolith was then impregnated with an aqueous solution of ammonium metavanadate and oxalic acid to give a vanadium concentration of about 5% based on the weight of the ceria-alumina coating, dried, and calcined again at to 500° C. for 30 minutes.

EXAMPLE 2

The catalyst obtained in Example 1 was installed in a continuous flow laboratory reactor. A simulated turbine exhaust gas consisting of 42 ppm NO, 15% $O_2$, 10% $H_2O$, $NH_3$ as required by $NH_3/NO$ mole ratio, and the balance $N_2$ was introduced into the reactor at a temperature of 400° C. The catalyst achieved $NO_x$ removal in excess of 80% with an $NH_3/NO$ ratio of 1.0 and GHSV of 30,000 $Hr^{-1}$.

EXAMPLE 3

A co-mingled cerium hydrate-alumina slurry was prepared as in Example 1 and applied to a ferritic stainless steel foil metal monolith catalyst substrate, dried, and calcined at 500° C. Vanadium was applied to the ceria-alumina mixture as in Example 1 in the amount of 460 g per cubic foot volume of substrate or 6500 g of the ceria-alumina carrier mixture. The catalyst was then dried and calcined at 500° C. for 30 minutes. A catalyst sample of 5.5 in3 by volume was placed in a continuous flow laboratory reactor. A simulated turbine exhaust gas consisting of 42 ppm NO, 15% $O_2$, 10% $H_2O$, $NH_3$ as required by $NH_3/NO$ mole ratio, and the balance $N_2$ was introduced into the reactor at 30,000 $Hr^{-1}$ GHSV at a temperature of 400° C. NO conversion results are shown in the figure drawing. The results show the improved activity of the present catalyst comprising vanadia on a mixture of ceria-alumina relative to a catalyst consisting of vanadia-alumina or ceria-alumina.

The following examples illustrate the significance of using both ceria and vanadia and of incorporating the vanadium component into the catalyst separately from the ceria:

EXAMPLE 4

An aqueous slurry was prepared by vigorously agitating 122 parts of gamma-alumina in 100 parts of water. A thin coating of this slurry was then applied to a honeycomb support as used in Example 1 followed by drying and calcining at 500° C. for 30 minutes. The amount of gamma-$Al_2O_3$ on the support was about 18% of the total weight of the support.

The thus coated support was then used to prepare the following catalysts for comparison purposes:

CATALYST A

This catalyst was prepared by impregnating a support prepared as described above, with an aqueous solution comprising 8.3% by weight of cerium present as cerium acetate, drying and calcining at 500° C. for 30 minutes. The impregnation, drying and calcining operations were repeated. This was followed by impregnating the ceria-treated support with a 9.3% by weight solution of ammonium metavanadate followed by drying and calcining at 500° C. for 30 minutes. The resulting catalyst (Catalyst A) contained about 2.58% ceria, 3.62% vanadia and 18.2% alumina based on the total catalyst weight, including the support.

CATALYST B

This catalyst was prepared in the same way as Catalyst A except that, instead of sequential applications of the ceria and vanadia, the applications were combined by impregnating the support with a solution containing 4.2% cerium as cerium acetate and 4.6% ammonium metavanadate followed by drying and calcining at 500° C. for 30 minutes. The indicated application, drying and calcining were repeated to give a product containing 17.8% alumina, 1.7% ceria and 2.84% vanadia ($V_2O_5$).

CATALYST C

This catalyst was prepared as in the case of Catalyst A except that the incorporation of ceria was omitted entirely.

CATALYST D

This catalyst was prepared as in the case of Catalyst A except that the incorporation of vanadia was omitted entirely.

Catalysts A-D were tested as in Example 2 with the following results given in percentage of $NO_x$ removal at 400° C.;

| Catalyst | % $NO_x$ removal |
| --- | --- |
| A | 84% |
| B | 76% |
| C | 73% |
| D | 67% |

As will be evident, Catalyst A, representative of the invention catalst, containing both ceria and vanadia applied sequentially, demonstrated significantly better $NO_x$ removal than the other catalysts.

Various modifications may be made in the invention, the scope of which is defined in the following claims.

I claim:

1. A catalyst consisting essentially of vanadium oxide carried by a mixture of ceria and alumina wherein ceria comprises at least 2% by weight of said mixture on a ceramic or metallic support, said mixture having been calcined at 500° C., the vanadium oxide being incorporated into the catalyst separately from the ceria and alumina.

2. The catalyst of claim 1 wherein the ceria comprises from 2-60% by weight of said mixture.

3. The catalyst of claim 2 wherein the vanadium of the vanadium oxide comprises from 0.5-25% by weight of said mixture.

4. The catalyst of claim 3 wherein the vanadium oxide is present as vanadium pentoxide.

5. A supported catalyst consisting essentially of vanadia, ceria and alumina, the vanadia being carried by a mixture of the ceria and alumina wherein ceria comprises at least 2% by weight of said mixture and being incorporated into the catalyst separately from the ceria and alumina, said mixture of ceria and alumina having been calcined at 500° C.

6. A process for preparing the catalyst of claim 1 which comprises applying alumina and ceria to a support, calcining at 500° C., and only thereafter incorporating the vanadium.

7. A process accoriding to claim 6 wherein the vanadium oxide is incorporated in the form of an aqueous soulution or slurry of vanadia precursor followed by drying and calcining to form vanadium oxide in situ.

8. A process according to claim 6 wherein a mixture of ceria and alumina is applied to a ceramic or metal substrate followed by drying and calcining, and then vanadium is applied as a slurry or solution of a vanadium compound over a ceria-alumina coating on the substrate, after which the resulting composite is dried and calcined to form vanadium oxide in situ.

* * * * *